US010073509B2

(12) United States Patent
Lin (10) Patent No.: US 10,073,509 B2
(45) Date of Patent: Sep. 11, 2018

(54) ELECTRONIC DEVICE FOR COMBINING MULTIPLE POWER SIGNALS

(71) Applicant: Quanta Computer Inc., Taoyuan (TW)

(72) Inventor: Chun-Fong Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 104 days.

(21) Appl. No.: 15/008,999

(22) Filed: Jan. 28, 2016

(65) Prior Publication Data

US 2017/0185125 A1 Jun. 29, 2017

(30) Foreign Application Priority Data

Dec. 23, 2015 (TW) .............................. 104143317 A (51) Int. Cl.
*G06F 1/26* (2006.01)

(52) U.S. Cl.
CPC .............. *G06F 1/266* (2013.01); *G06F 1/263* (2013.01)

(58) Field of Classification Search
CPC ....................................................... G06F 1/266
See application file for complete search history.

(56) References Cited

U.S. PATENT DOCUMENTS

| 2007/0001646 A1* | 1/2007 | Kojima | H02J 7/0011 320/128 |
| 2008/0102765 A1* | 5/2008 | Louks | G06F 1/263 455/90.1 |
| 2009/0079264 A1* | 3/2009 | Minami | G06F 1/266 307/44 |
| 2015/0333515 A1 | 11/2015 | Tseng et al. | |

FOREIGN PATENT DOCUMENTS

TW  201542939 A  11/2015

OTHER PUBLICATIONS

Semig, Pete, and Collin Wells. "A Current Sensing Tutorial—Part 1: Fundamentals." EE Times, Feb. 8, 2012, 05:45 PM EST, www.eetimes.com/document.asp?doc_id=1279404. Accessed Mar. 9, 2018.*
Chinese language office action dated Mar. 1, 2017, issued in application No. TW 104143317.

* cited by examiner

*Primary Examiner* — Kim Huynh
*Assistant Examiner* — Joshua Neveln
(74) *Attorney, Agent, or Firm* — McClure, Qualey & Rodack, LLP (57) ABSTRACT

An electronic device includes a multi-input power system and a power management system. The multi-input power system is configured to combine a first power signal with a second power signal, and output a combined power signal. The power management system is configured to manage the combined power signal. The electronic device supports a standard of USB (Universal Serial Bus) Type-C Power Delivery.

8 Claims, 6 Drawing Sheets

ELECTRONIC DEVICE FOR COMBINING MULTIPLE POWER SIGNALS

CROSS REFERENCE TO RELATED APPLICATIONS

This Application claims priority of Taiwan Patent Application No. 104143317 filed on Dec. 23, 2015, the entirety of which is incorporated by reference herein.

BACKGROUND OF THE INVENTION

Field of the Invention

The disclosure generally relates to an electronic device, and more specifically, to an electronic device for combining multiple power signals.

Description of the Related Art

A conventional mobile device usually has a single power supply port coupled to a single AC-to-DC (Alternating Current to Direct Current) converter. Even if a user has two or more AC-to-DC converters, they cannot simultaneously supply electric power to the mobile device. Generally, AC-to-DC converters have a variety of output standards. The conventional mobile device generally supports only one AC-to-DC convert connection for power supply or power charge because it cannot obtain every output standard of different AC-to-DC converters.

To solve the above problem, there is a need to design a novel device, so that two or more AC-to-DC converters can provide electric power for one mobile device simultaneously.

BRIEF SUMMARY OF THE INVENTION

In a preferred embodiment, the invention is directed to an electronic device including a multi-input power system and a power management system. The multi-input power system is configured to combine a first power signal with a second power signal, and output a combined power signal. The power management system is configured to manage the combined power signal.

In some embodiments, the electronic device supports a standard of USB (Universal Serial Bus) Type-C Power Delivery.

In some embodiments, the multi-input power system includes a first current sensor, a first voltage regulator, a second current sensor, a second voltage regulator, and a power distribution control logic circuit. The first current sensor detects a current of the first power signal, and generates a first current feedback signal. The first voltage regulator detects a voltage of the first power signal, and generates a first voltage feedback signal. The second current sensor detects a current of the second power signal, and generates a second current feedback signal. The second voltage regulator detects a voltage of the second power signal, and generates a second voltage feedback signal. The power distribution control logic circuit controls a voltage and a current of the combined power signal according to the first current feedback signal, the first voltage feedback signal, the second current feedback signal, and the second voltage feedback signal.

In some embodiments, the power distribution control logic circuit further generates a first voltage control signal according to the first current feedback signal and the first voltage feedback signal, and further generates a second voltage control signal according to the second current feedback signal and the second voltage feedback signal.

In some embodiments, the first voltage regulator increases or decreases the voltage of the first power signal according to the first voltage control signal, so as to output a first regulated power signal. The second voltage regulator increases or decreases the voltage of the second power signal according to the second voltage control signal, so as to output a second regulated power signal. The combined power signal is formed by combining the first regulated power signal with the second regulated power signal.

In some embodiments, a voltage of the first regulated power signal is identical to a voltage of the second regulated power signal, such that the first regulated power signal and the second regulated power signal are parallel with each other and form the combined power signal. A power of the combined power signal is equal to a total power of the first regulated power signal and the second regulated power signal.

In some embodiments, the electronic device further includes a first input port, a first controller, a second input port, and a second controller. The first input port is coupled to a first AC-to-DC (Alternating Current to Direct Current) converter. The first input port receives the first power signal from the first AC-to-DC converter. The first controller receives a first datum relative to the first AC-to-DC converter, and relays the first datum to the multi-input power system and the power management system. The second input port is coupled to a second AC-to-DC converter. The second input port receives the second power signal from the second AC-to-DC converter. The second controller receives a second datum relative to the second AC-to-DC converter, and relays the second datum to the multi-input power system and the power management system. The power management system optimizes a power distribution of the combined power signal according to the first datum and the second datum.

In some embodiments, the first datum includes an output voltage and an output current of the first AC-to-DC converter, and the second datum includes an output voltage and an output current of the second AC-to-DC converter.

In some embodiments, the electronic device is a notebook computer.

In some embodiments, the electronic device is a USB (Universal Serial Bus) hub.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
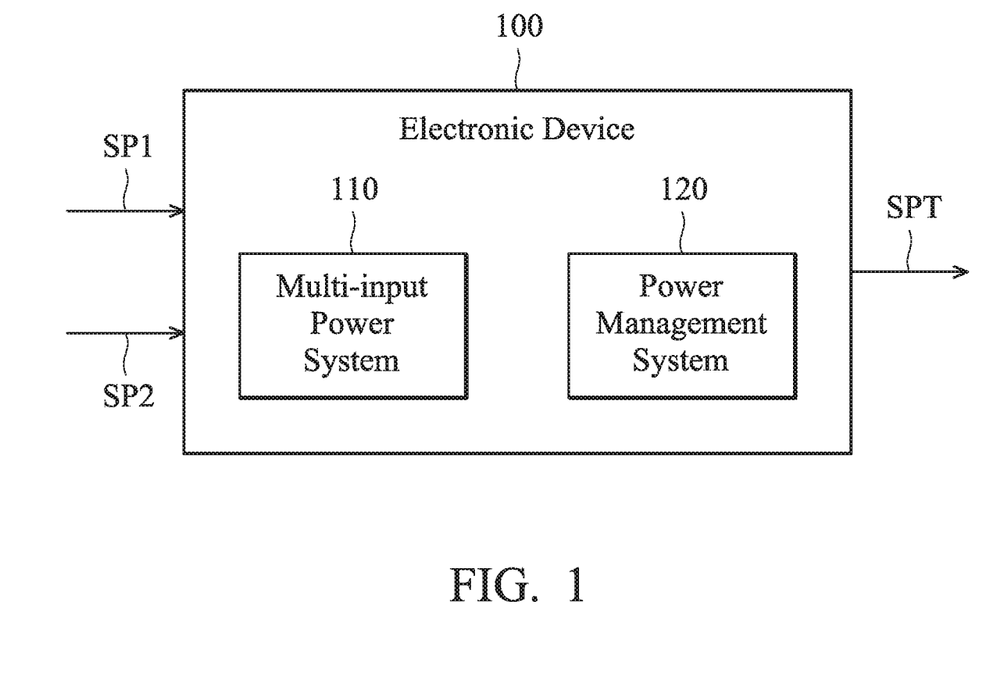
FIG. 1 is a diagram of an electronic device according to an embodiment of the invention.

FIG. 1 is a diagram of an electronic device 100 according to an embodiment of the invention. As shown in FIG. 1, the electronic device 100 at least includes a multi-input power system 110 and a power management system 120. In a preferred embodiment, the electronic device 100 supports the standard of USB (Universal Serial Bus) Type-C Power Delivery. The electronic device 100 receives a first power signal SP1 and a second power signal SP2. The voltage of the first power signal SP1 may be different from the voltage of the second power signal SP2. The multi-input power system 110 combines the first power signal SP1 with the second power signal SP2, and outputs a combined power signal SPT. For example, the power of the combined power signal SPT may be equal to the total power of the first power signal SP1 and the second power signal SP2. The power management system 120 may be an MCU (Microcontroller Unit) or an EC (Embedded Controller). The power management system 120 manages the combined power signal SPT. For example, the power management system 120 can control and optimize the power distribution of the combined power signal SPT, such that the combined power signal SPT can supply electric power to a loading element with high efficiency. It should be understood that although the electronic device 100 combines only two power signals in the embodiment of FIG. 1, the electronic device 100 is capable of combining three, four, five, or more power signals so as to generate the combined power signal SPT in other embodiments.

Figure 2:
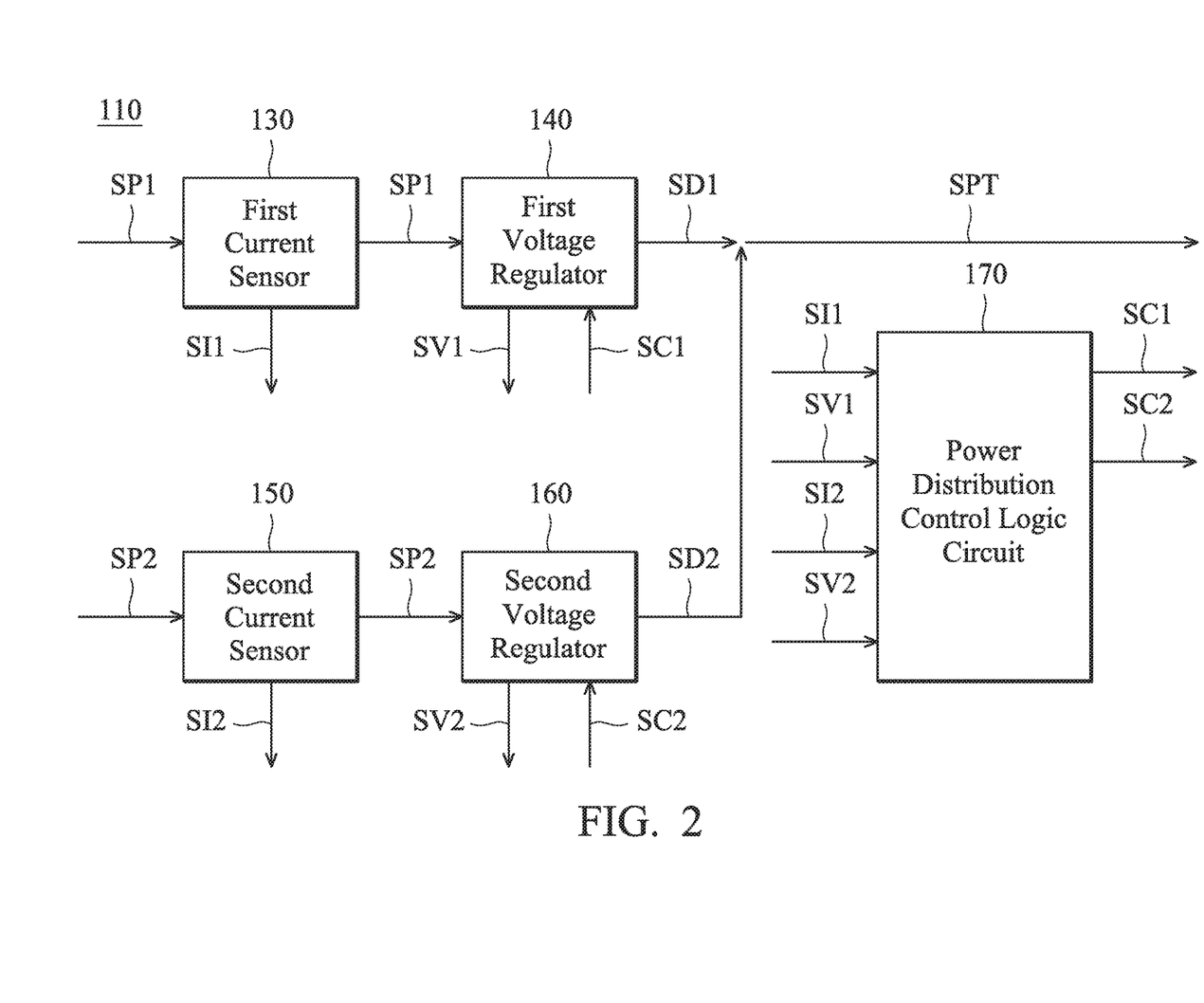
FIG. 2 is a diagram of a multi-input power system according to an embodiment of the invention.

FIG. 2 is a diagram of the multi-input power system 110 according to an embodiment of the invention. In the embodiment of FIG. 2, the multi-input power system 110 includes a first current sensor 130, a first voltage regulator 140, a second current sensor 150, a second voltage regulator 160, and a power distribution control logic circuit 170. The first current sensor 130 detects the current of the first power signal SP1, and generates a first current feedback signal SI1. The first voltage regulator 140 detects the voltage of the first power signal SP1, and generates a first voltage feedback signal SV1. The second current sensor 150 detects the current of the second power signal SP2, and generates a second current feedback signal SI2. The second voltage regulator 160 detects the voltage of the second power signal SP2, and generates a second voltage feedback signal SV2. The power distribution control logic circuit 170 controls the voltage and the current of the combined power signal SPT according to the first current feedback signal SI1, the first voltage feedback signal SV1, the second current feedback signal SI2, and the second voltage feedback signal SV2. It should be understood that although the multi-input power system 110 includes only two current sensors and two voltage regulators in the embodiment of FIG. 2, the multi-input power system 110 can include three, four, five, or more current sensors and voltage regulators so as to process more power signals in other embodiments.

In some embodiments, the power distribution control logic circuit 170 further generates a first voltage control signal SC1 according to the first current feedback signal SI1 and the first voltage feedback signal SV1. In some embodiments, the power distribution control logic circuit 170 further generates a second voltage control signal SC2 according to the second current feedback signal SI2 and the second voltage feedback signal SV2. The first voltage regulator 140 can increase or decrease the voltage of the first power signal SP1 according to the first voltage control signal SC1, so as to output a first regulated power signal SD1. The second voltage regulator 160 can increase or decrease the voltage of the second power signal SP2 according to the second voltage control signal SC2, so as to output a second regulated power signal SD2. The combined power signal SPT can be formed by combining the first regulated power signal SD1 with the second regulated power signal SD2. Specifically, the voltage of the first regulated power signal SD1 may be identical to the voltage of the second regulated power signal SD2, such that the first regulated power signal SD1 and the second regulated power signal SD2 may be parallel with each other and may form the combined power signal SPT. The power of the combined power signal SPT may be equal to the total power of the first regulated power signal SD1 and the second regulated power signal SD2.

For example, the signal parameters may be set as follows. These parameters are assumed for the reader to easily understand the invention, but they are not used to restrict the patent scope of the invention. The first power signal SP1 may have a voltage of 20V and a current of 1A, and its power may be 20 W. The second power signal SP2 may have a voltage of 5V and a current of 2 A, and its power may be 10 W. The power distribution control logic circuit 170 may control the first voltage regulator 140 to decrease the voltage of the first power signal SP1, and may control the second voltage regulator 160 to increase the voltage of the second power signal SP2, such that the first regulated power signal SD1 and the second regulated power signal SD2 may have the same voltage. For example, after passing through the first voltage regulator 140, the first regulated power signal SD1 may have a voltage of 10V and a current of 2 A, and its power may still be 20 W; after passing through the second voltage regulator 160, the second regulated power signal SD2 may have a voltage of 10V and a current of 1 A, and its power may still be 10 W. In other words, the first voltage regulator 140 and the second voltage regulator 160 are configured to control the voltage of the first regulated power signal SD1 and the voltage of the second regulated power signal SD2, respectively. It should be noted that the power of the first regulated power signal SD1 may be substantially equal to the power of the first power signal SP1, and the power of the second regulated power signal SD2 may be substantially equal to the power of the second power signal SP2. The first regulated power signal SD1 and the second regulated power signal SD2 may be parallel with each other and form the combined power signal SPT because they have the same voltage. For example, the combined power signal SPT may have a voltage of 10V and a current of 3 A (i.e., 1 A+2 A), and its power may be 30 W (i.e., 20 W+10 W).

Figure 3A:
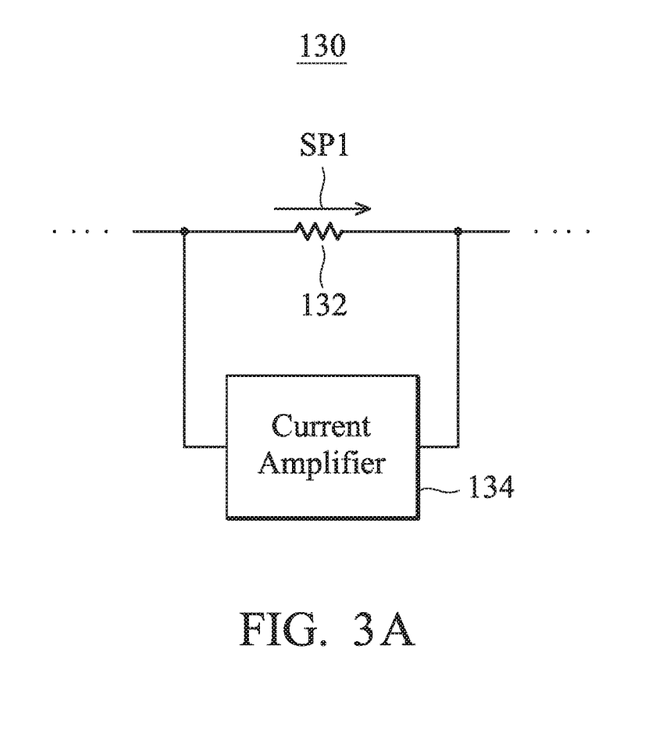
FIG. 3A is a diagram of a current sensor according to an embodiment of the invention.

FIG. 3A is a diagram of the first current sensor 130 according to an embodiment of the invention. In the embodiment of FIG. 3A, the first current sensor 130 includes a resistor 132 and a current amplifier 134. The resistor 132 has a relatively small resistance, and it almost does not affect the voltage of the first power signal SP1. The first power signal SP1 may pass through the resistor 132. The current amplifier 134 can detect and amplify the current flowing through the resistor 132, so as to generate the first current feedback signal SI1. In alternative embodiments, the current amplifier 134 is replaced with a voltmeter, and the voltmeter generates the first current feedback signal SI1 according to a voltage difference between two terminals of the resistor 132. It should be understood that the configuration of the first current sensor 130 can be correspondingly applied to the configuration of the second current sensor 150.

Figure 3B:
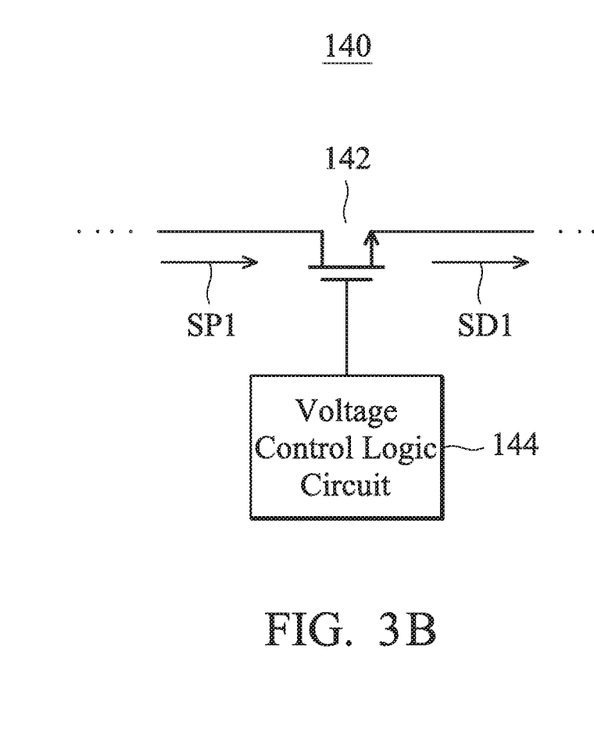
FIG. 3B is a diagram of a voltage regulator according to an embodiment of the invention.

FIG. 3B is a diagram of the first voltage regulator 140 according to an embodiment of the invention. In the embodiment of FIG. 3B, the first voltage regulator 140 includes an MOSFET (Metal-Oxide-Semiconductor Field-Effect Transistor) 142 and a voltage control logic circuit 144. The MOSFET 142 may be an N-type MOSFET or a P-type MOSFET. The MOSFET 142 may have a control terminal, a first terminal for receiving the first power signal SP1, and a second terminal for outputting the first regulated power signal SD1. The voltage control logic circuit 144 adjusts the voltage at the control terminal of the MOSFET 142 according to the first voltage control signal SC1, so as to increase or decrease the resistance between the first terminal and the second terminal of the MOSFET 142. For example, if the aforementioned resistance increases, the voltage of the first regulated power signal SD1 will decrease, and if the aforementioned resistance decreases, the voltage of the first regulated power signal SD1 will increase. The first voltage regulator 140 may further include one or more voltmeters for detecting the voltage of the first power signal SP1 and the voltage of the first regulated power signal SD1, so as to generate the first voltage feedback signal SV1. It should be understood that the configuration of the first voltage regulator 140 can be correspondingly applied to the configuration of the second voltage regulator 160.

Figure 4:
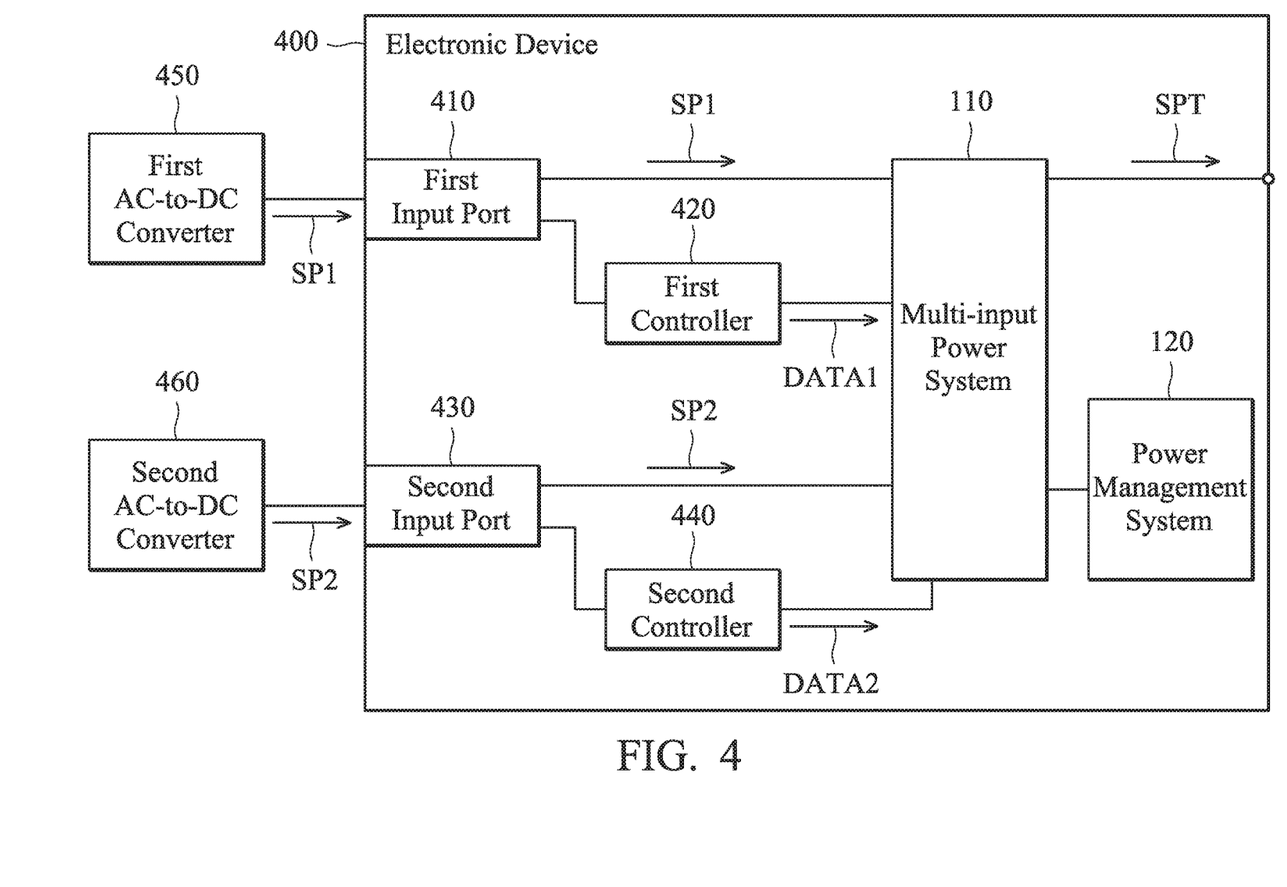
FIG. 4 is a diagram of an electronic device according to an embodiment of the invention.

FIG. 4 is a diagram of an electronic device 400 according to an embodiment of the invention. FIG. 4 is similar to FIG. 1. In the embodiment of FIG. 4, the electronic device 400 further includes a first input port 410, a first controller 420, a second input port 430, and a second controller 440. For example, the first input port 410 and the second input port 430 may be two different USB Type-C socket ports, and the first controller 420 and the second controller 440 may be two different USB Type-C Power Delivery controllers. The first input port 410 may be coupled to a first AC-to-DC (Alternating Current to Direct Current) converter 450. The first input port 410 may receive the first power signal SP1 from the first AC-to-DC converter 450. The first controller 420 receives a first datum DATA1 relative to the first AC-to-DC converter 450, and relays the first datum DATA1 to the multi-input power system 110 and the power management system 120. The second input port 430 may be coupled to a second AC-to-DC converter 460. The second input port 430 may receive the second power signal SP2 from the second AC-to-DC converter 460. The second controller 440 receives a second datum DATA2 relative to the second AC-to-DC converter 460, and relays the second datum DATA2 to the multi-input power system 110 and the power management system 120. The first AC-to-DC converter 450 and the second AC-to-DC converter 460 may be external power supply devices, and both of them may be coupled to an AC electric power source. The first AC-to-DC converter 450 and the second AC-to-DC converter 460 may have different output voltages and different output currents. Both of the first AC-to-DC converter 450 and the second AC-to-DC converter 460 can support the standard of USB Type-C Power Delivery. The first datum DATA may include an output voltage and an output current of the first AC-to-DC converter 450. For example, the output voltage of the first AC-to-DC converter 450 may be equal to the voltage of the first power signal SP1, and the output current of the first AC-to-DC converter 450 may be equal to the current of the first power signal SP1. The second datum DATA2 may include an output voltage and an output current of the second AC-to-DC converter 460. For example, the output voltage of the second AC-to-DC converter 460 may be equal to the voltage of the second power signal SP2, and the output current of the second AC-to-DC converter 460 may be equal to the current of the second power signal SP2. The multi-input power system 110 controls the first voltage regulator 140 and the second voltage regulator 160 according to the first datum DATA1 and the second datum DATA2. For example, the identical final voltage of the first regulated power signal SD1 and the second regulated power signal SD2 may be determined according to the first datum DATA1 and the second datum DATA2. The power management system 120 can optimize the power distribution of the combined power signal SPT according to the first datum DATA1 and the second datum DATA2. For example, the power management system 120 may control the distribution settings of the power distribution control logic circuit 170 according to the first datum DATA1 and the second datum DATA2. It should be understood that although the electronic device 400 includes only two input ports and two controllers in the embodiment of FIG. 4, the electronic device 400 can include three, four, five, or more input ports and controllers for coupling to more AC-to-DC converters and receiving more power signals in other embodiments.

Figure 5:
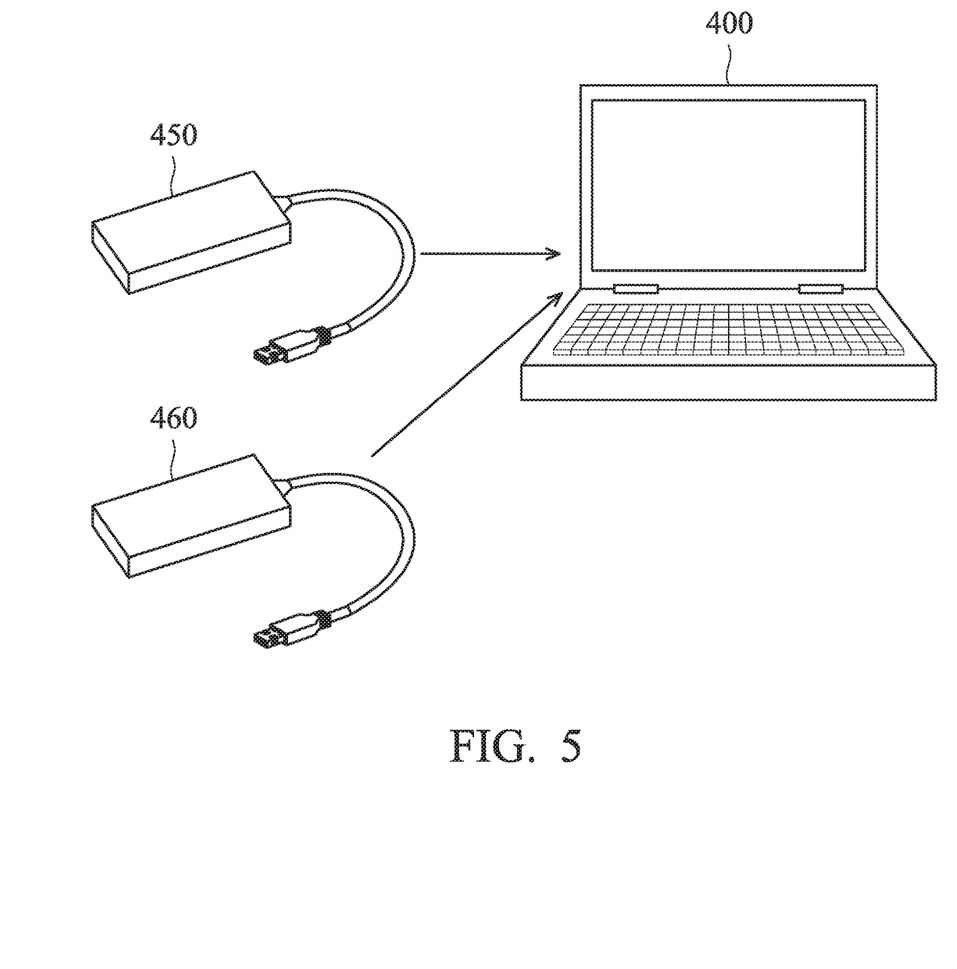
FIG. 5 is a diagram of an electronic device according to an embodiment of the invention.

FIG. 5 is a diagram of the electronic device 400 according to an embodiment of the invention. In the embodiment of FIG. 5, the electronic device 400 is a notebook computer. The multi-input power system 110 and the power management system 120 are built in the notebook computer. The first input port 410 and the second input port 430 of the notebook computer are coupled to the first AC-to-DC converter 450 and the second AC-to-DC converter 460, simultaneously having different output standards. The first input port 410 and the second input port 430 of the notebook computer receive DC supply electric power from the first AC-to-DC converter 450 and the second AC-to-DC converter 460 at the same time.

Figure 6:
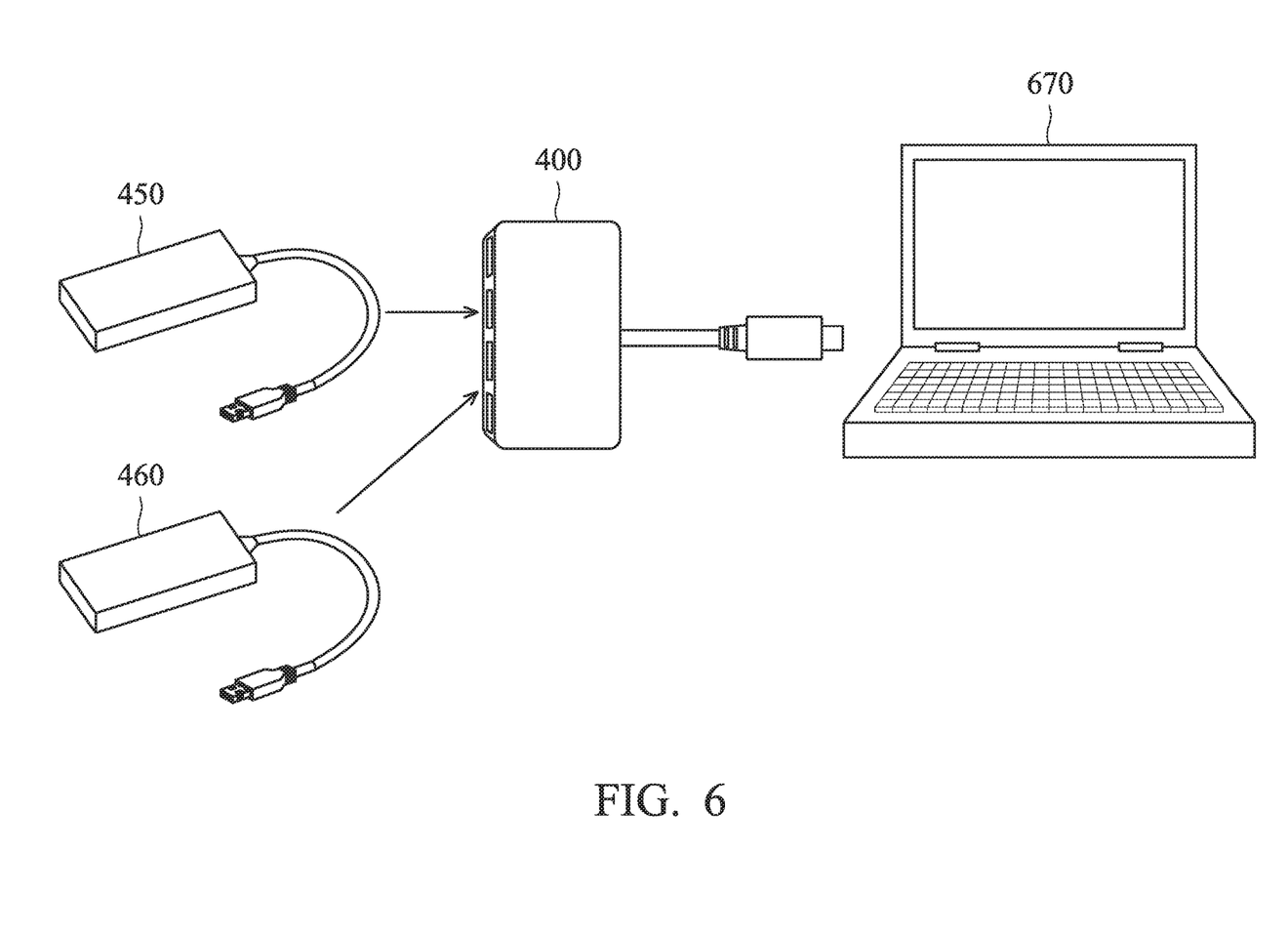
FIG. 6 is a diagram of an electronic device according to another embodiment of the invention.

FIG. 6 is a diagram of the electronic device 400 according to another embodiment of the invention. In the embodiment of FIG. 6, the electronic device 400 is a USB hub. The multi-input power system 110 and the power management system 120 are disposed in the USB hub. The first input port 410 and the second input port 430 of the USB hub are coupled to the first AC-to-DC converter 450 and the second AC-to-DC converter 460 having different output standards simultaneously. The first input port 410 and the second input port 430 of the USB hub receive DC supply electric power from the first AC-to-DC converter 450 and the second AC-to-DC converter 460 at the same time. An output port of the USB hub can be further coupled to a notebook computer 670, and the DC supply electric power can be transmitted through the USB hub to the notebook computer 670. In other embodiments, the notebook computer 670 may be replaced by other electronic devices, such as a smartphone or a tablet computer.

The invention proposes a novel electronic device, which can receive power signals from two or more AC-to-DC converters having different output standards and then combine these power signals. The electronic device of the invention may be an independent device, or be built into an electronic device. By accumulating the total output power of all AC-to-DC converters, the invention significantly improves the power supply speed, the system performance, and the charge efficiency for the devices. Accordingly, the invention is suitable for application in a variety of electronic devices.

Note that the above voltage, current, and power are not limitations of the invention. A designer can adjust these settings according to different requirements. It should be understood that the electronic device of the invention is not limited to the configurations of FIGS. 1-6. The invention may merely include any one or more features of any one or more embodiments of FIGS. 1-6. In other words, not all of the features shown in the figures should be implemented in the electronic device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An electronic device, comprising:
    a multi-input power system, combining a first power signal with a second power signal, and outputting a combined power signal; and
    a power management system circuit, managing the combined power signal;
    wherein the multi-input power system circuit comprises:
    a first current sensor, detecting a current of the first power signal, and generating a first current feedback signal;
    a first voltage regulator, detecting a voltage of the first power signal, and generating a first voltage feedback signal;
    a second current sensor, detecting a current of the second power signal, and generating a second current feedback signal;
    a second voltage regulator, detecting a voltage of the second power signal, and generating a second voltage feedback signal; and
    a power distribution control logic circuit, controlling a voltage and a current of the combined power signal according to the first current feedback signal, the first voltage feedback signal, the second current feedback signal, and the second voltage feedback signal;
    wherein the first current sensor comprises a resistor and a current amplifier, the first power signal passes through the resistor, and the current amplifier generates the first current feedback signal by detecting and amplifying the current through the resistor;
    wherein the power distribution control logic circuit further generates a first voltage control signal according to the first current feedback signal and the first voltage feedback signal;
    wherein the first voltage regulator increases or decreases the voltage of the first power signal according to the first voltage control signal, so as to output a first regulated power signal;
    wherein the first voltage regulator comprises a P-type MOSFET (Metal-Oxide-Semiconductor Field-Effect Transistor) and a voltage control logic circuit, wherein the P-type MOSFET has a control terminal, a first terminal for receiving the first power signal, and a second terminal for outputting the first regulated power signal, and wherein the voltage control logic circuit adjusts a voltage at the control terminal of the P-type MOSFET according to the first voltage control signal, so as to increase or decrease a resistance between the first terminal and the second terminal of the P-type MOSFET.

2. The electronic device as claimed in claim 1, wherein the power distribution control logic circuit further generates a second voltage control signal according to the second current feedback signal and the second voltage feedback signal.

3. The electronic device as claimed in claim 2, wherein the second voltage regulator increases or decreases the voltage of the second power signal according to the second voltage control signal, so as to output a second regulated power signal, and wherein the combined power signal is formed by combining the first regulated power signal with the second regulated power signal.

4. The electronic device as claimed in claim 3, wherein a voltage of the first regulated power signal is identical to a voltage of the second regulated power signal, such that the first regulated power signal and the second regulated power signal are parallel with each other and form the combined power signal, and wherein a power of the combined power signal is equal to a total power of the first regulated power signal and the second regulated power signal.

5. The electronic device as claimed in claim 1, further comprising:
    a first input port, coupled to a first AC-to-DC (Alternating Current to Direct Current) converter, and receiving the first power signal from the first AC-to-DC converter;
    a first controller, receiving a first datum relative to the first AC-to-DC converter, and relaying the first datum to the multi-input power system and the power management system circuit;
    a second input port, coupled to a second AC-to-DC converter, and receiving the second power signal from the second AC-to-DC converter; and
    a second controller, receiving a second datum relative to the second AC-to-DC converter, and relaying the second datum to the multi-input power system and the power management system circuit;
    wherein the power management system circuit optimizes a power distribution of the combined power signal according to the first datum and the second datum.

6. The electronic device as claimed in claim 5, wherein the first datum comprises an output voltage and an output current of the first AC-to-DC converter, and the second datum comprises an output voltage and an output current of the second AC-to-DC converter.

7. The electronic device as claimed in claim 1, wherein the electronic device is a notebook computer.

8. The electronic device as claimed in claim 1, wherein the electronic device is a USB (Universal Serial Bus) hub.

* * * * *